United States Patent
Joshi et al.

(10) Patent No.: US 12,488,087 B2
(45) Date of Patent: Dec. 2, 2025

(54) DEFENDING AGAINST COMPUTING ATTACKS

(71) Applicant: Dell Products L.P., Round Rock, TX (US)

(72) Inventors: Abhidnya Sushant Joshi, Pune (IN); Poornima Gupte, Pune (IN); Nisarga Lolage, Pune (IN); Narendra Pal Singh, Pune (IN)

(73) Assignee: Dell Products L.P., Round Rock, TX (US)

( * ) Notice: Subject to any disclaimer, the term of this patent is extended or adjusted under 35 U.S.C. 154(b) by 398 days.

(21) Appl. No.: 17/570,580

(22) Filed: Jan. 7, 2022

(65) Prior Publication Data

US 2023/0139683 A1    May 4, 2023

(30) Foreign Application Priority Data

Nov. 3, 2021 (IN) .............................. 202111050546

(51) Int. Cl.
*G06F 21/51* (2013.01)
*G06F 21/55* (2013.01)

(52) U.S. Cl.
CPC ............ *G06F 21/51* (2013.01); *G06F 21/552* (2013.01); *G06F 2221/2135* (2013.01)

(58) Field of Classification Search
CPC . G06F 21/51; G06F 21/552; G06F 2221/2135
See application file for complete search history.

(56) References Cited

U.S. PATENT DOCUMENTS

| | | | |
|---|---|---|---|
| 11,475,132 B2 * | 10/2022 | Vasudeva | G06F 21/54 |
| 2004/0250124 A1 * | 12/2004 | Chesla | G06F 21/552 |
| | | | 709/224 |
| 2018/0211033 A1 * | 7/2018 | Aditham | G06F 21/52 |
| 2020/0137084 A1 * | 4/2020 | Roy | H04L 63/0236 |
| 2020/0274894 A1 * | 8/2020 | Argoeti | H04L 63/1433 |
| 2021/0044609 A1 * | 2/2021 | Keshtkarjahromi | H04L 63/102 |
| 2021/0288981 A1 * | 9/2021 | Numainville | H04L 63/1441 |
| 2022/0060479 A1 * | 2/2022 | Perkins | H04L 63/20 |
| 2023/0035146 A1 * | 2/2023 | Khanvilkar | G06F 21/313 |
| 2023/0214834 A1 * | 7/2023 | Moloney | G06Q 20/4012 |
| | | | 705/72 |

* cited by examiner

*Primary Examiner* — Joseph L Greene
(74) *Attorney, Agent, or Firm* — Workman Nydegger (57) ABSTRACT

A security service for detecting and/or deterring computing attacks. A security service maintains counters related to different attack types for applications or clients including distributed applications. Information regarding requests received by the application are processed by the security service. When any of the counters exceed an associated threshold, an action can be performed in response.

20 Claims, 8 Drawing Sheets

DEFENDING AGAINST COMPUTING ATTACKS

FIELD OF THE INVENTION

Embodiments of the present invention generally relate to data security and data security operations. More particularly, at least some embodiments of the invention relate to systems, hardware, software, computer-readable media, and methods for defending against computing attacks and for providing security as a service.

BACKGROUND

Security is a crucial aspect of datacenters and other computing systems. Without security measures, immense amounts of data are at risk. Providing security in datacenters, however, is not trivial. Datacenters have complex network topologies that include applications and servers from different subnets communicating with each other. The ability to detect and avoid rogue clients, applications, or users is challenging in such a heterogeneous environment.

Existing solutions often support a brute force detection mechanism. For example, a user account may be locked after a certain number of incorrect authentication attempts. However, a brute force approach may be inadequate and may not always avoid these types of attacks. Further, brute force detection methods do not always consider the motivations or reasons behind the attacks. These reasons may include to deliberately lock a user account, to guess the password of a particular user, to slow down a server by performing incorrect authentication requests from different users, different clients, or the same client, to consume server-side resources by bombarding the server with certain RPCs/REST (Remote Procedure Call/Representation State Transfer) commands, or to overload a specific subnet.

Many of these attacks lead to a denial of service or other problems. As a result, a brute force detection mechanism may not provide enough protection. Systems and methods are needed to defend against brute force and denial of service attacks and to provide robust security.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data security and data security operations. More particularly, at least some embodiments of the invention relate to systems, hardware, software, computer-readable media, and methods for detecting and/or avoiding attacks including overload attacks. Examples of overload attacks include brute force attacks and denial of service attacks in computing systems.

In general, example embodiments of the invention relate to a security service configured to detect attacks or potential attacks. The security service may run on a standalone server or as a service in an environment such as a containerized environment. Embodiments of the invention provide a centralized manner of detecting attacks and can adapt to different computing environments. Embodiments of the invention are further configured to detect and/or prevent attacks in a distributed computing environment or for a distributed application.

For example, an attack on a stand-alone server may differ from an attack in a distributed application, where there can be multiple replicas or servers. By implementing a centralized security service, attacks can be detected and/or avoided in various environments including containerized environments. Further, in a containerized environment, embodiments of the invention can detect and/or avoid an attack without requiring the replicas to talk to one another. Rather, the replicas of a distributed application can communicate with a centralized security service that all replicas can use in detecting/avoiding attacks. Once an attack is indicated by the security service, the application can be notified. Notifying the application, as discussed herein, may include providing notification to one or more replicas or servers associated with the application.

Embodiments of the security service disclosed herein, by way of example and not limitation, can provide protection against attacks including (i) password guessing, (ii) too many authentication requests to slow down a server, (iii) bombarding the server to consume server-side resources, (iv) overloading the network, and the like or combination thereof.

Embodiments of the security service may include a plug and play mechanism that any server-side application can use. An application can initialize the security service with the type of attacks that are of interest. Further, the security service can provide flexibility with regard to attack thresholds. In other words, the defense or response to an attack or a potential attack may not occur until a threshold requirement is satisfied. Further, different applications may set different thresholds.

The security service may use different types of counters. Some counters may involve a single counter while other counters may involve a tuple. These counters can be incremented/decremented. Consider a counter for connections. When a client connects with an application or a server, the connection count for that application is incremented. When the connection is ended, the connection count for that application is decremented. Each counter may be associated with a threshold value. When the counter exceeds the threshold value, an action may be recommended. In the context of connections, the application may no longer accept new connections until the connection counter drops sufficiently. Each type of attack that the security service can detect may be associated with one or more counters and/or with one or more recommended actions.

Figure 1:
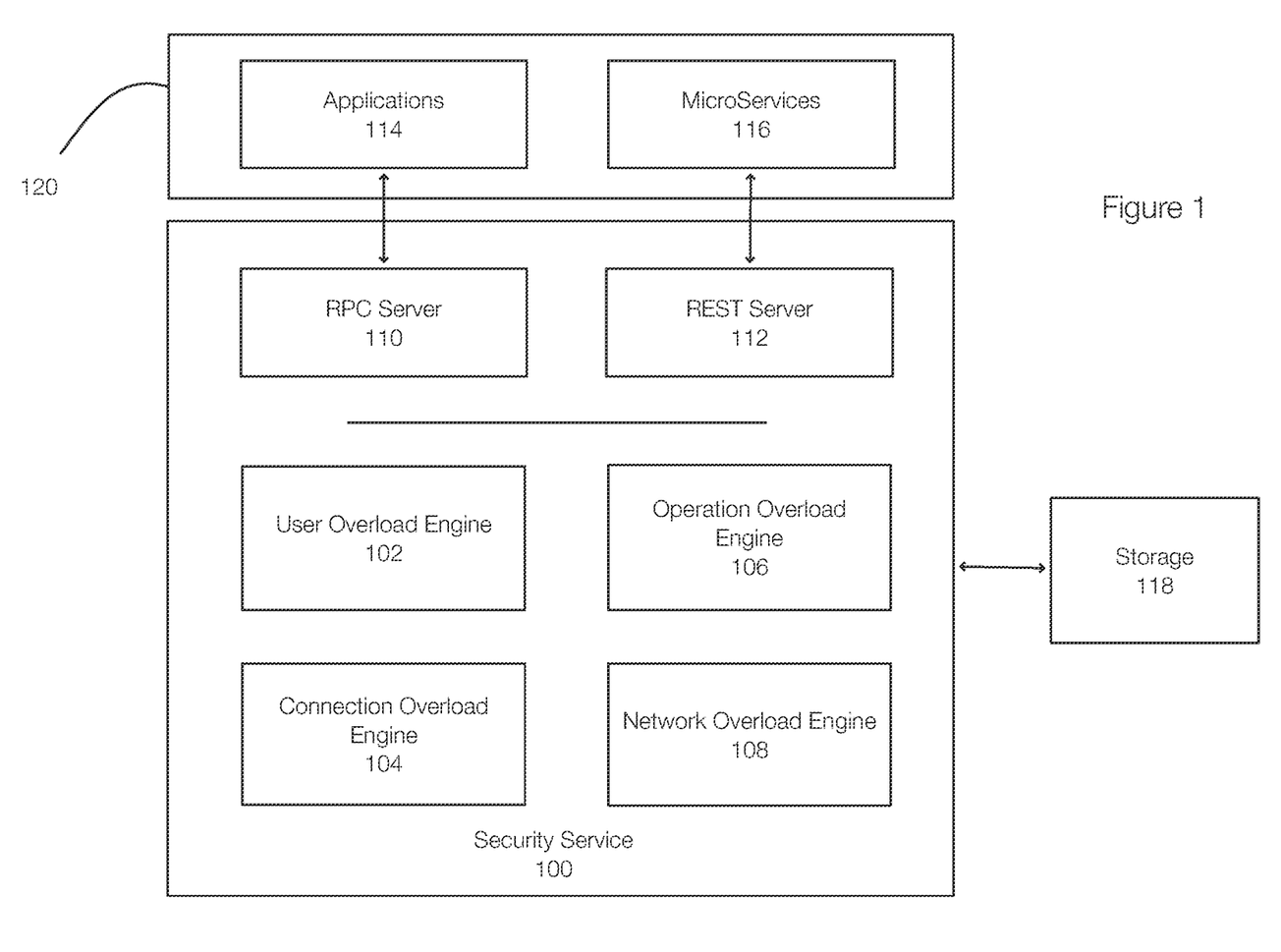
FIG. 1 discloses aspects of a security service configured to detect and/or avoid computing related attacks including overload type attacks.

FIG. 1 discloses aspects of a security service configured to detect and/or avoid attacks on or in a computing system. FIG. 1 illustrates a security service 100 that includes an RPC (Remote Procedure Call) server 110 and a REST (Representation State Transfer) server 112. These servers 110 and 112 may provide an interface to the security service 100 for applications 114 and microservices 116. The applications 114 and microservices 116 are referred to as consumers or clients 120. Other clients 120 of the security service 100 may access the security service 100 over an appropriate API (Application Programming Interface) or other suitable interface.

The security service 100 can be used as a library in a monolithic architecture that is directly linked with an application. When used as a service, the security service 110 provides interfaces (e.g., servers 110 and 112) for the clients or applications. Thus, the application may be a client from the perspective of the security service. The application may also be accessed by clients.

The security service 110 may be associated with, include, or have access to storage 118. The storage 118 may be used to store information related to detecting and/or avoiding attacks. The information may be specific to each client (e.g., application, replica) using the security service 100. The security service 100 may provide centralized tracking that allows attacks or potential attacks to be detected and that allows actions to be taken in response for monolithic architectures and distributed applications. The security service 100 provides tracking and, when a threshold is passed, indicate that an attack may be present. This allows actions to be taken to protect the application.

The security service 100 may include a user overload engine 102, a connection overload engine 104, an operation overload engine 106, and a network overload engine 108. Each of these engines is responsible for detecting a particular type of attack. Each of these engines 102, 104, 106, and 108 may maintain information, such as counters, in the storage 118. These counters allow the engines to detect specific types of attacks. Whenever an attack is detected, by any of the engines 102, 104, 106, and 108, the security service 100 may notify the relevant application and may provide a recommended action. The application, of course, may perform any desired action. One benefit of the security service 100 is that attacks can be detected holistically and thus expands beyond more simple brute force detection methods.

The security service 100 may recommend that certain actions be taken whenever an attack is detected. The following discussion often assumes that the clients 120 adopt any action recommended by the security service 100. However, the security service 100 only makes recommendations and the clients 120 are able to perform any action they desire. The client may adopt the recommendation (if present), change the recommendation, or perform other protective or preventative action.

Figure 2:
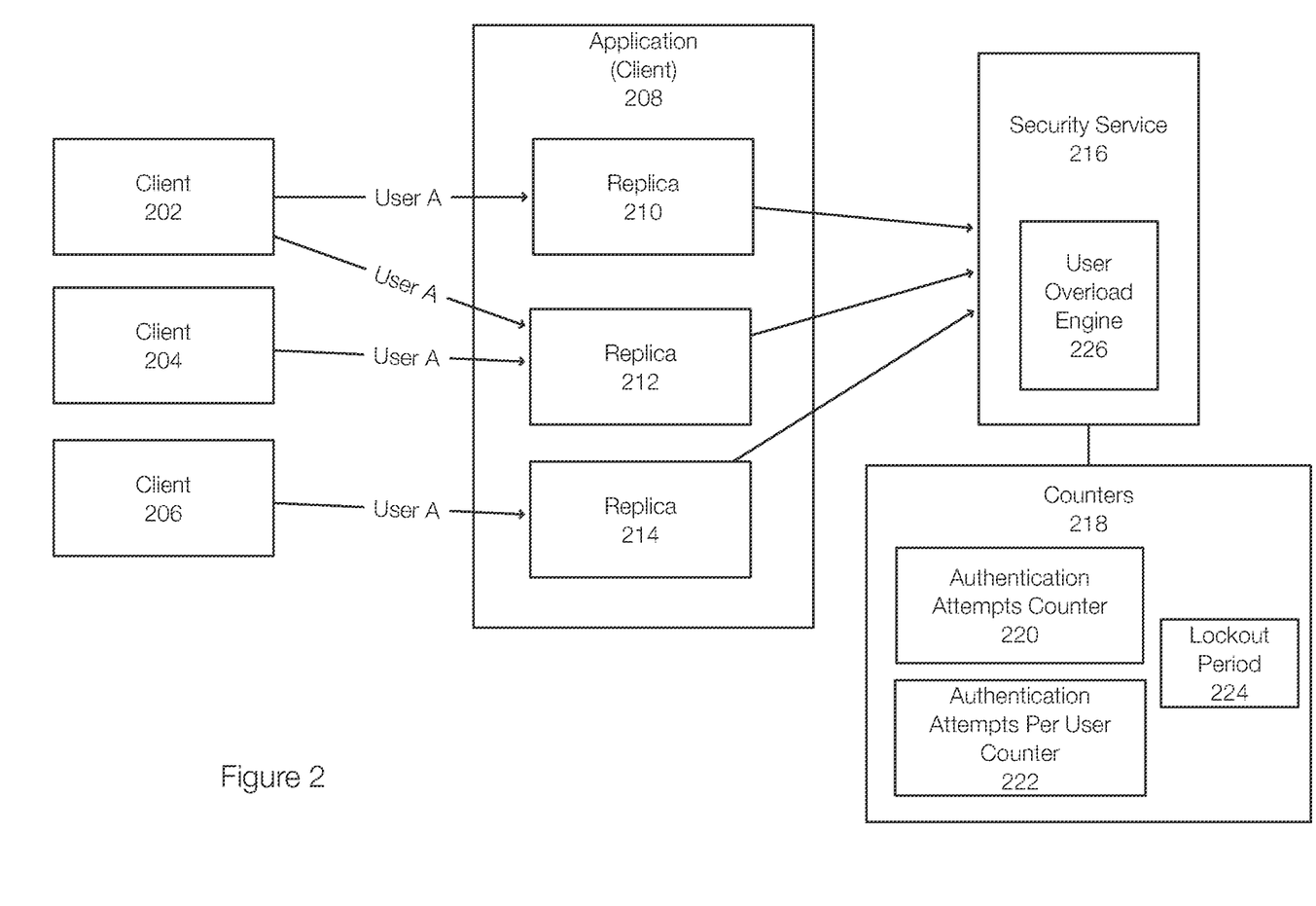
FIG. 2 discloses aspects of a security service configured to detect user overload attacks.

FIG. 2 discloses aspects of a security service configured to detect user overload attacks. In FIG. 2, the application 208 is a client to the security service 216 and the clients 202, 204, and 206 are clients of the application 208. The security service 216, an example of the security service 100, includes a user overload engine 226 that is an example of the user overload engine 102. Aspects of the disclosure discussed with respect to any of the engines may also be applicable to the other engines.

The engine 226 is responsible determining when authentication requests become overloaded and constitute a threat or an attack. This may relate to wrong authentication requests and per user authentication requests. If any of these requests are over a corresponding threshold, the engine 226 may recommend to the application 208 that the request/user be locked out or blocked, at least for a certain period. This allows the application 208 to process valid user requests. Locking out an authentication request (or a specific user) also ensures that resources such as memory, file descriptors, and the like of the application 208 are not overly consumed.

The clients 202, 204, and 206 authenticating to the application 208 can use any authentication method such as LDAP, SAML, OAUTH, AD, or the like. The security service 216 provides interface for its clients, such as the application 208, to set authentication request status like "SUCCESS" or "DENIED". The security service 216 can use these status or other information to maintain appropriate counters and the like.

FIG. 2 illustrates an example of protecting from attacks related to user-overload. User overload attacks may relate to total authentication attempts and/or authentication attempts per user. In protecting against a user overload attack, the security service 216 may maintain counters 218 including an authentication attempts counter 220 and an authentication attempts per user counter 222. A lockout period 224 may also be associated with this type of user overload attack.

In this example, the application 208 may be running on multiple replicas, represented by replicas 210, 212, and 214. A User A may attempt to authenticate from different clients. Thus, the User A may attempt to authenticate from the client 202 to the replicas 210 and 212. The user A may attempt to authenticate at the replica 212 from the client 204. The user A may attempt to authenticate from the client 206 to the replica 214.

As illustrated in FIG. 2, the user overload attack can be detected using the security service 216 without requiring the replicas 210, 212, and 214 to communicate with each other. Each of the replicas 210, 212 and 214 can simply communicate with the security service 216.

Each of the authentication attempts illustrated in FIG. 2 are communicated to the security service 216 by the relevant replica. The replica 210, for example, communicates one authentication request from the User A while the replica 212 communicates 2 authentication requests from the User A.

The authentication attempts counter 220 tracks the total authentication requests received by the application 208. More specifically, the counter 220 tracks the total authentication requests received by all of the replicas 210, 212, and 214 of the application 208 without requiring the replicas 210, 212, and 214 to communicate with each other.

As previously suggested, the application 208 may set a threshold for the counter 220. If the counter 220 goes over the threshold, all further authentication requests may be blocked. More specifically, the security service 216 may inform each of the replicas 210, 212, and 214 that the counter 220 has exceeded the threshold. Each of the replicas 210, 212, and 214 may then block subsequent authentication requests, at least for a lockout period 224 in one example. When existing connections are closed, the counter 220 will go down and new authentication requests will be allowed once the counter 220 is below the threshold. This ensures that the available resources at the servers or at the replicas are not exceeded.

In FIG. 2, the total number of authentication requests received by the replicas is four. Thus, the counter 220 is 4 in this example and each of the replicas 210, 212 and 214 communicated with the security service 216 independently. However, the counter 220 is maintained for all of the replicas as a whole. This allows an attack to be detected for a distributed application even when the authentication attempts are directed to different replicas.

The authentication attempts per user counter 222 is used to track authentication requests per user. Thus, the security service 216 may include a counter 222 for each user of the application 208. The counters 220 and 222 may reset if there has been no change for a specified period of time.

If a user makes too many wrong authentication requests based on the counter associated with that user, the security service 216 may recommend that the user be locked out for a lockout period 224 (or other period). The application 208 (or all of the replicas 210, 212 and 214) enforce the lockout period 224 for that user. Stated differently, the security service 216 may recommend an action whenever too many wrong authentication requests have been made. However, the application 208 may perform any action such as a lockout, delay, deny, or the like for any desired time period.

The lockout period 224 is configurable and can be configured for each user. The lockout period 224 (or other action enforced by the application 208) can be different for different users. The counters 220 and 222 can be used to prevent users from overwhelming the replicas. The counters 220 and 222 may be associated with different lockout periods 224.

In this example, all requests for all users are blocked when the counter 220 exceeds its associated threshold. Because the counters 218 include multiple counters 222 (one for each user), requests from a specific user can be blocked when the corresponding counter 222 exceeds its associated threshold.

FIG. 2 also illustrates the ability to take actions with regard to specific users. Thus, the counter 220 accounts for all authentication attempts while the counter 222 accounts for user specific authentication attempts. As a result, there may be multiple counters 222. As illustrated in FIG. 2, a user A attempted to authenticate with the application 208 from multiple clients 202, 204, and 206. The authentication requests are received by different replicas. However, the counters 220 and 222 are both being incremented in response to these requests. More specifically, the replica 210 communicates with the security service 216 when the request from user A is received. This causes both of the counters 220 and 222 to be incremented. The counters 220 and 220 are similarly incremented based on communications from the replicas 212 and 214.

Once the counter 222, which is specific to User A in this example, meets its threshold, the application 208 is notified. The application 208 may implement the recommended lockout period 224 (a recommendation is not required) or perform other action with respect to the user A. Assuming that the application 208 implements the lockout period 224, the user A will be locked out at least for the lockout period 224.

If the counter 220 satisfies its associated threshold, all authentication requests may be blocked, at least for a certain period. With regard to the recommended lockout period 224, additional or different actions may be taken by the application 208. These actions can be recommended by the security service 216. The actual response, however, is implemented by the application 208 in one embodiment. For example, a user may be required to reset their password or perform other action in order to regain access.

Figure 3:
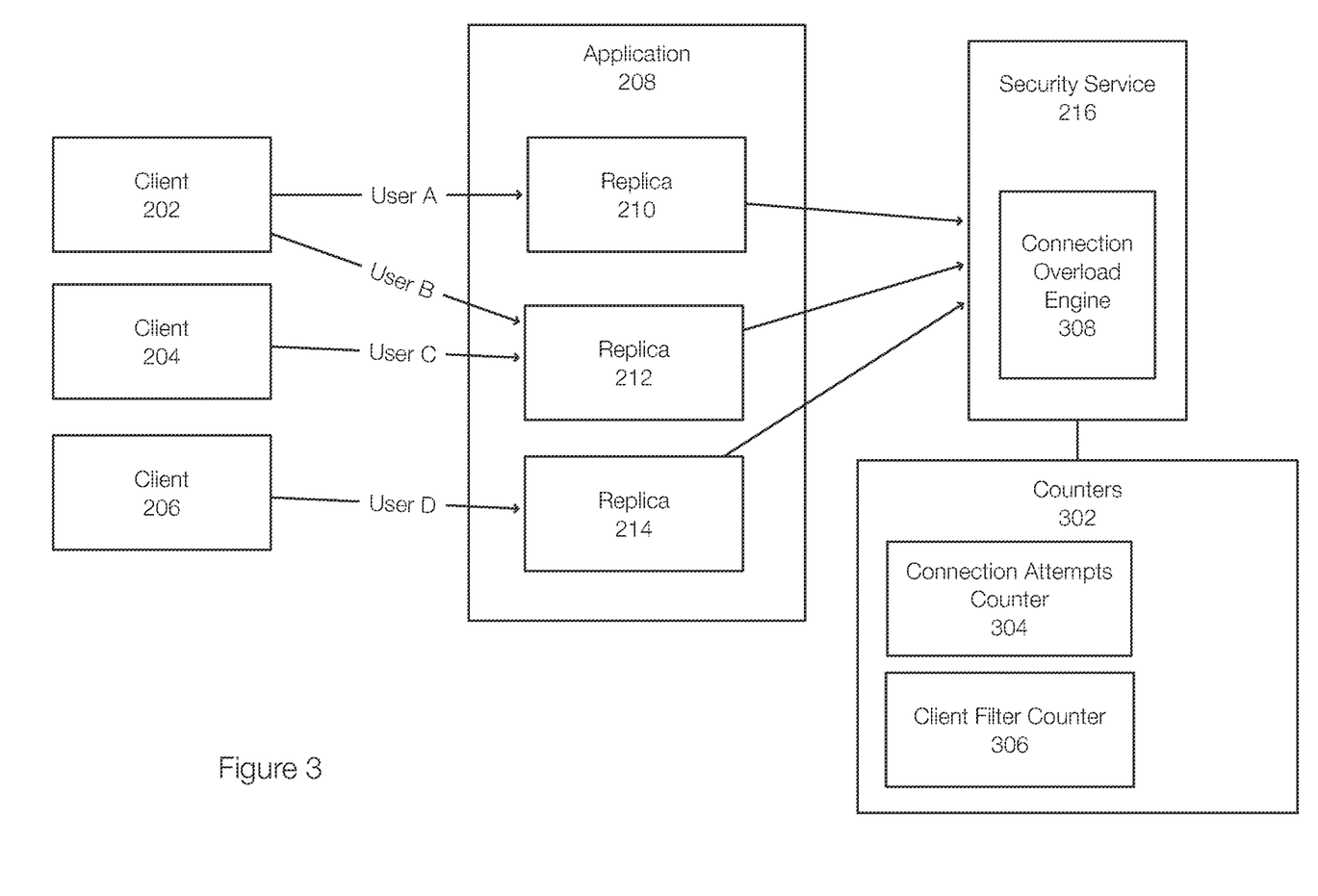
FIG. 3 discloses aspects of a security service configured to detect connection overload attacks.

FIG. 3 discloses aspects of a security service configured to detect connection overload attacks (e.g., detect brute force attacks or denial of service attacks). FIG. 3 illustrates aspects of the connection overload engine 308, which is an example of the connection overload engine 104.

In order to use the application 208, clients, users often establish connections, via clients, to the application 208. When available connections to the application 208 are consumed, the application 208 may not be available. This is how a denial-of-service attack may be performed—by consuming all of the connections to the application.

FIG. 3 expands on the configuration shown in FIG. 2 to illustrate the counters 302 associated the connection overload engine 308, which is configured to detect a connection overload attack. More specifically, the counters 302 associated with detecting a connection overload include a connection attempts counter 304 and a client filter counter 306. The connection attempts counter 304 tracks overall connection attempts and the client filter counter 306 tracks per client connection attempts. As a result, there may be multiple client filter counters 306.

The application 208 can specify thresholds to ensure that connection counts remain under control. The counters 304 and 306 are each associated with threshold or threshold values. The security service 216 maintains these counters 302 and provides an interface for the application 208 (or the replicas 210, 212, and 214) to atomically increase/decrease the counters 304 and 306. Application can specify these counters/thresholds to ensure connection count remains under control. The security service 216 maintains these counters 302 internally and provides an interface for the applications to atomically increase/decrease the counters 304 and 306 whenever a connection is established/disconnected.

For any connection that is attempted when the either of the counters 304 and 306 have exceeded their associated threshold, the security service 216 may return an error that the replica or application can return to the client. For example, a message (and/or error code) such as INSUFFICIENT RESOURCES/RETRY AFTER DELAY may be returned to the client attempting to establish a connection. The application 208 may determine the actual message or response returned to the client.

The connection attempts counter 304 tracks the overall connections to the application 208. The counter 304 is, in effect, a cumulative total of the connections at the replicas 210, 212, and 214.

The client filter counter 306 may be implemented as a tuple such as [client IP/hostname, maximum connection count]. When any client exceeds its maximum connection count, an error may be returned to the application 208. The counters 304 and 306 are used by the security service 216 to protect against connection overload attacks. When either of the counters 304 and 306 exceeds the corresponding threshold, the security service 216 may send a message to the application 208 (or to each of the replicas 210, 212, and 214). This message (or error message) can be returned in response to subsequent connections or until the connection count drops.

If the connection attempts counter 304 has exceeded the associated threshold when the User A makes a connection attempt from the client 202, the security service 216 may inform the replica 210 that an error should be generated. The replica 210 then returns an error message to the client 202. This continues until the counters 304 or 306 are below the relevant threshold.

The connection overload engine 308 is thus able to manage total connections to the application 208, regardless of where those connections occur. The connection overload engine 308 is also able to manage connections on a client basis. This ensures that the connections from any one client (e.g., one of the clients 202, 204, and 206) is not exceeded. The security service 216 protects the application 208 as a whole from connection overload and also protects the application 208 from rogue clients that may attempt to establish excessive connections.

Figure 4:
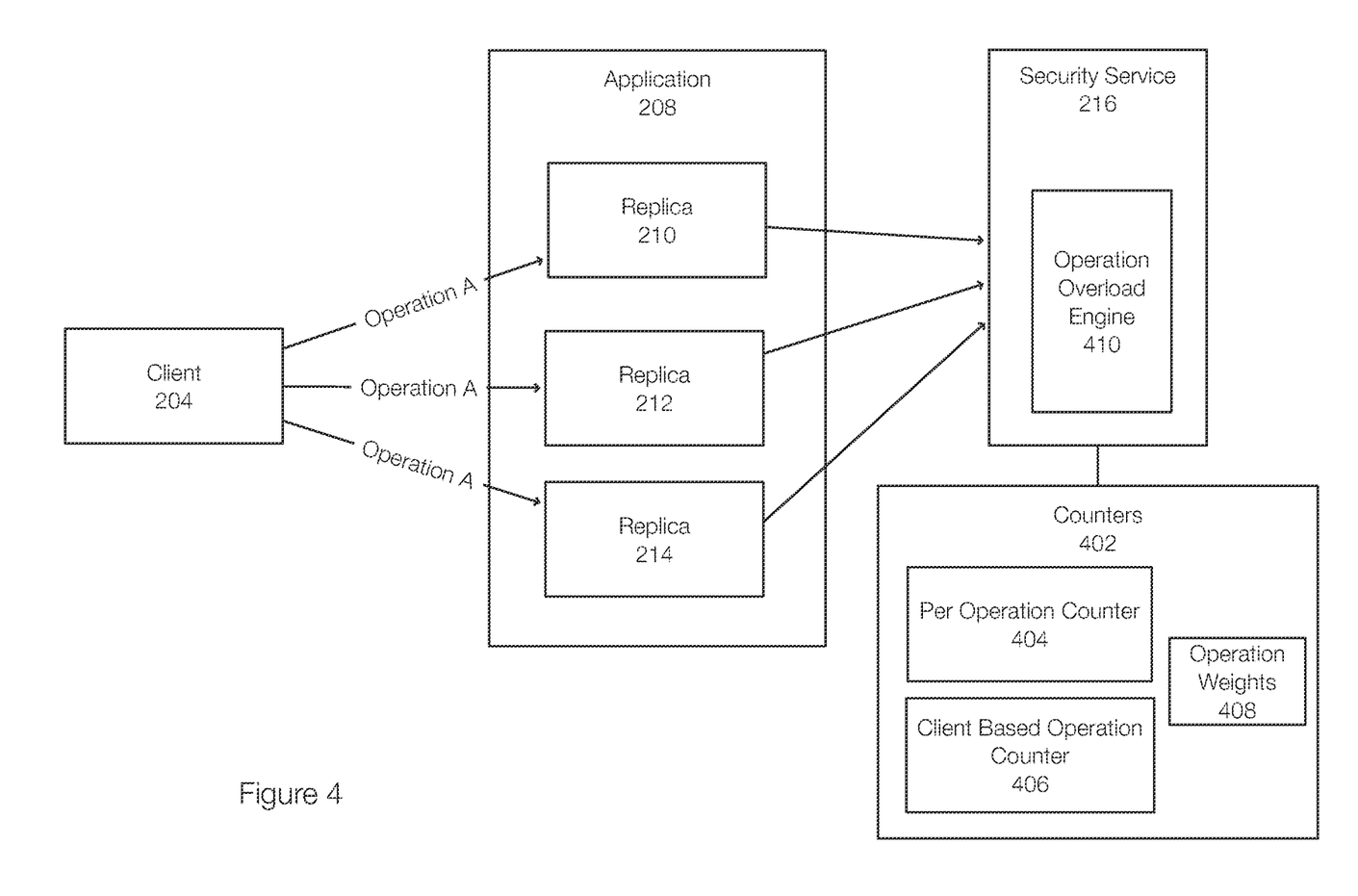
FIG. 4 discloses aspects of a security service configured to detect operation overload attacks.

FIG. 4 discloses aspects of a security service configured to detect operation overload attacks. The security engine 216 includes an operation overload engine 410, which is an example of the operation overload engine 106. The operation overload engine 410 detects operation attempts such as (RPC/REST) operations. The engine 410 maintains counters 402 including a per operation counter 404 and a client based operation counter 406. The application 208 may also assign operation weights 408 to different operations. By providing threshold values and/or weights, the security service 216 can use the counters 404 and 406 and the weights 408 in making decisions regarding whether to recommend allowing or denying an operation. For example, an excessive number of delete operations, when detected, may be prevented based on the weight while other operations may be allowed.

The per operation counter 404 tracks the number of operations. In one example, there may be a counter for each operation. Alternatively, a single counter 404 may be used. The counter 404 is atomically incremented/decremented when the operations start/complete. For example, an RPC based application may get repetitive requests for SYSTEM INFO. Too many of these requests may cause a resource crunch and may deprive other high priority operations.

When the counter 404 exceeds its threshold, decisions on whether to block or disallow an application may depend on the operation weight. A higher weighted operation (e.g., higher priority) may be allowed while blocking or delaying lower weighted operations. The counter 404 may also be associated with a second threshold. If the counter 404 exceeds the second threshold, all operations are disallowed until the counter 404 is reduced.

The client based operation counter 406 may be represented as a tuple such as [client IP/hostname, max operation cnt]. Whenever a specified operation requested by a client associated with a given tuple exceeds the count, an error is returned to the application 208. The application 208 may delay the operation or relay an error back to the client such as INSUFFICIENT RESOURCES.

The operation weight 408 determines the priority of the operation. Thus, a weight is associated with each operation. The security service 216 maintains a list of weights that the application 208 can use to perform Quality of Service (QoS) as required for operations.

Figure 5:
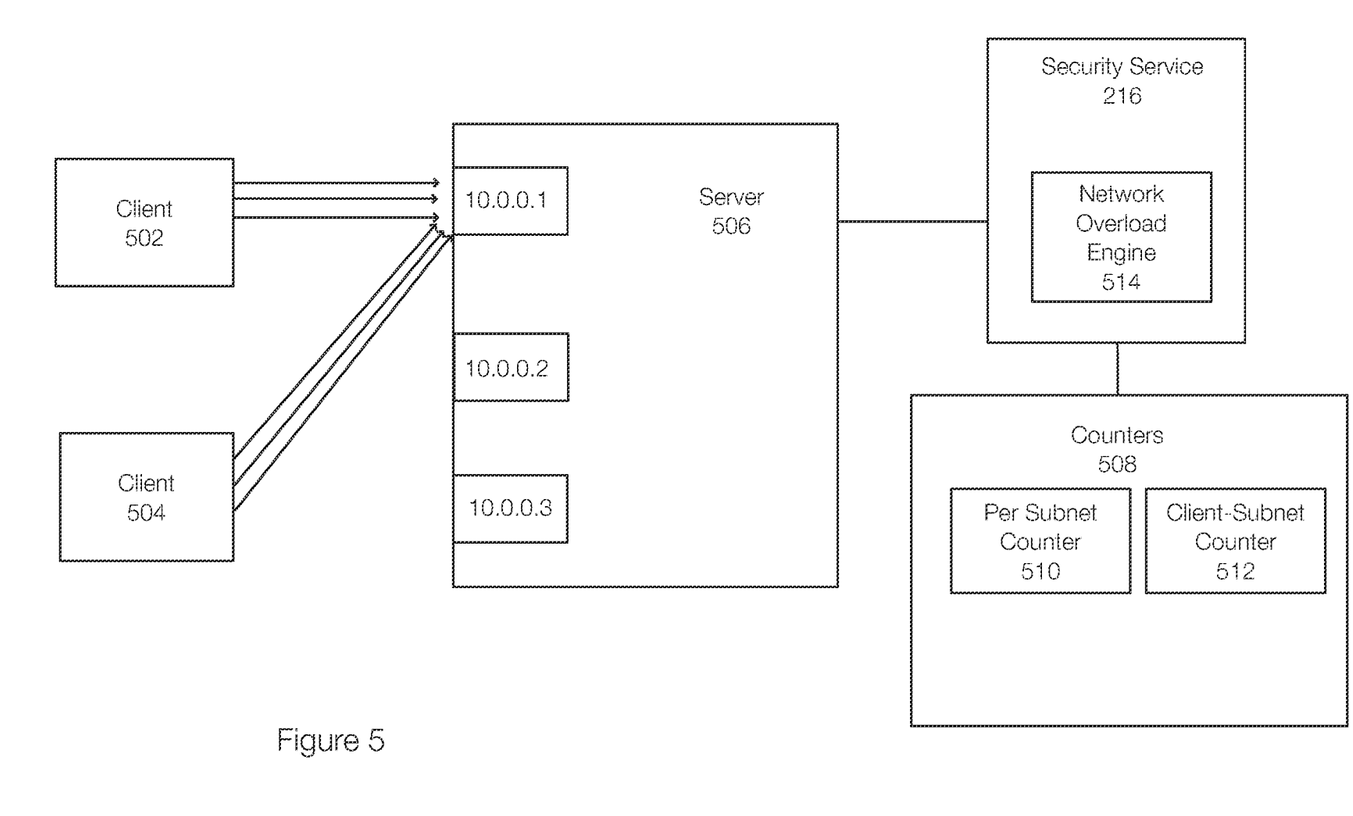
FIG. 5 discloses aspects of a security service configured to detect network overload attacks.

FIG. 5 discloses aspects of a security service configured to detect a network overload attack. The security service 216 includes a network overload engine 514, which is an example of the network overload engine 108. The network overload engine 514 detects overloads of connections per IP/subnet or other interface. More specifically, the server 506 (or application) may have multiple IP addresses available for clients. If multiple clients start using the same IP address, that subnet or connection may become overloaded. As illustrated in FIG. 5, each of the clients 502 and 504 are accessing the server 506 using multiple connections to the same IP address (10.0.0.1 in this example).

The security service 216 maintains counters 508 to detect network overload. When one of the counters 508 exceeds a threshold, the server 506 (or application) is informed so that the application can perform load balancing at the IP level. In addition or in the alternative, when the threshold is exceeded, the server 506 may receive an error message that can be relayed back to the client 502 and/or 504.

In this example, a per subnet counter 510 may be represented as a tuple such as [subnet, max conn cnt]. Whenever a connection is established on a particular IP/subnet, the respective counter is increased. The counter can be decreased when the connection is terminated.

The client subset counter 512 may also take the form of a tuple such as [client IP/hostname, subnet, max conn cnt]. The counter 512 is used to track a connection request from a particular client to a particular subnet. Using these counters and thresholds, attacks can be detected and ameliorative actions can be taken. Further, embodiments of the invention also help applications conserve resources and the like.

The security service 216 is configured to detect different types of attacks or potential attacks. Further, the counters allow an application (or server or the like) to take action to prevent the attacks, conserve resources, or the like.

Embodiments of the invention allow various parameters to be maintained on the server side for QoS (Quality of Service) purposes. The centralized tracking at the security service allows distributed attacks to be detected because the security service can be performed in a holistic manner rather than at a device specific level. Embodiments of the invention help stop rogue actors based on specific clients, networks, applications and/or specific RPCs or operations.

Figure 6:
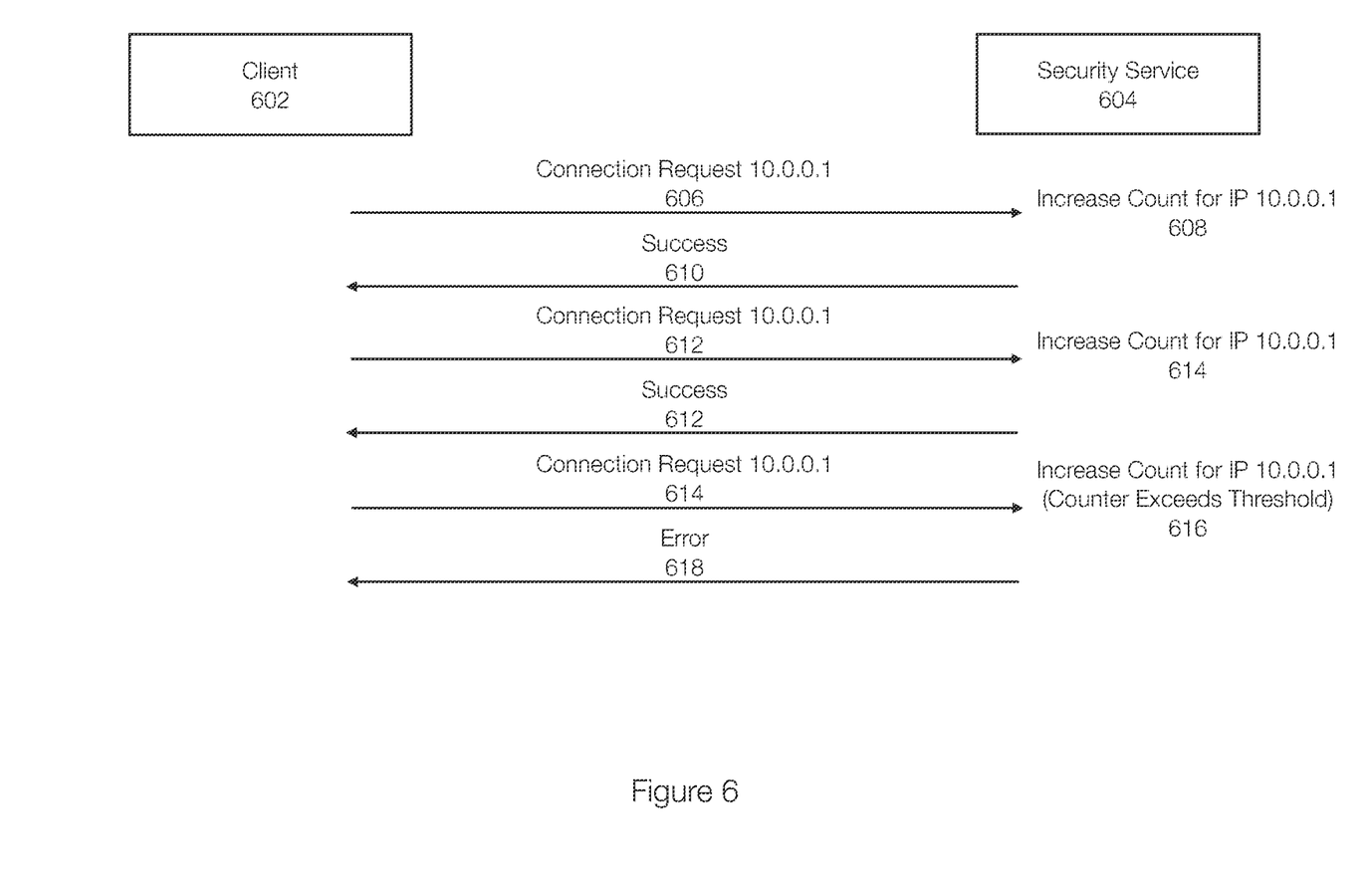
FIG. 6 discloses aspects of detecting an attack using a sequence diagram.

FIG. 6 discloses aspects of detecting an attack (or a potential problem) via a sequence diagram. While FIG. 6 is disclosed in the context of connections, a similar process may be used for other engines and counters. In FIG. 6, a connection request 606 is made to IP 10.0.0.1. The connection request 606 is received from the client 606 (e.g., an application), which in turn received a request from a client or user of the application. Thus, FIG. 6 illustrates a sequence between the application (or a particular server or replica thereof).

The security service 604, in response to the connection request 606 increases the counter 608. A success 610 response is sent to the client 602 and the connection is allowed by the client 602. A subsequent connection request 612 is received to IP 10.0.0.1. The security service 604 evaluates the counter 614 and relevant threshold and returns a success 612.

When information regarding the connection request 614 for IP 10.0.0.1 is received by the security service 604 from the client 602, the security service determines that the counter 616 exceeds the threshold. Thus, an error 618 is received by the client 602. The client 602 may send this message to the user requesting the connection. In this example, the counter could be the connection attempts counter 304 or the client filter counter 306. In fact, both counters would have been incremented. However, it is possible that only one of those counters exceeded the associated threshold.

Figure 7:
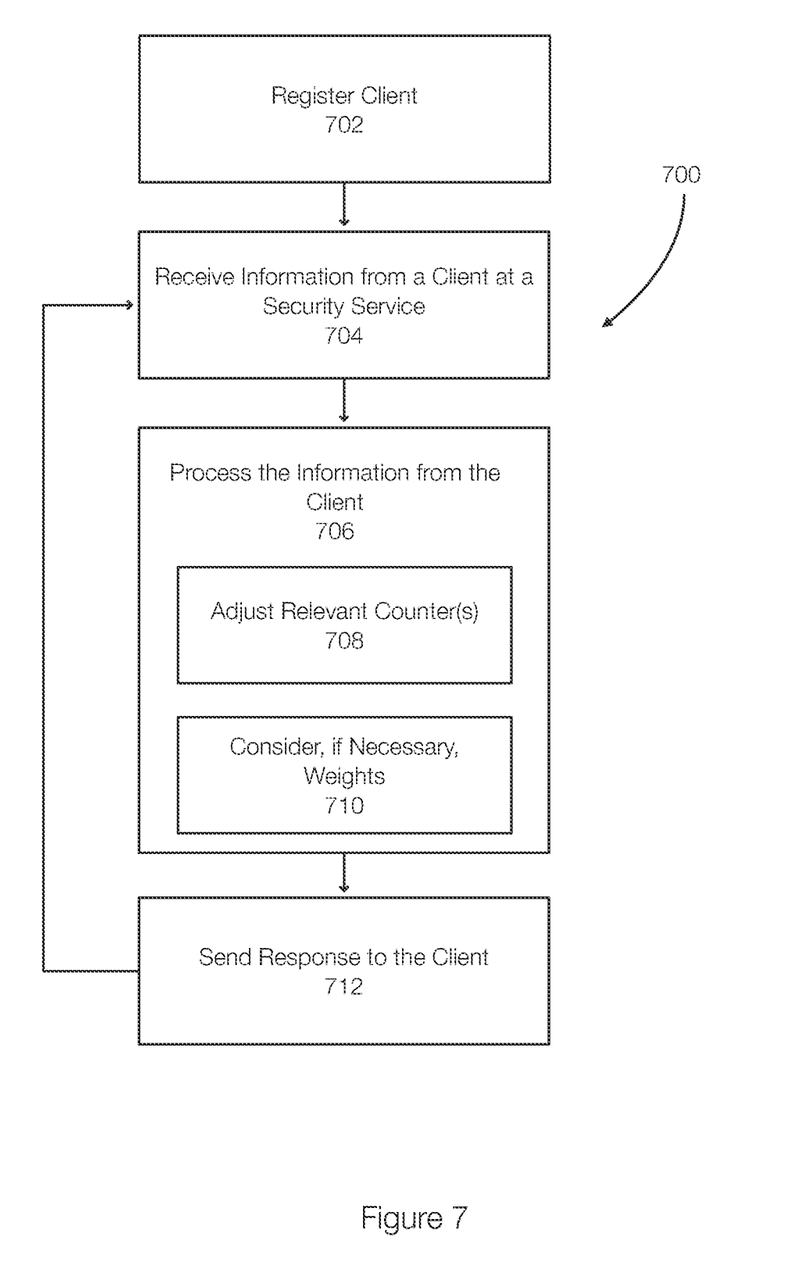
FIG. 7 discloses aspects of a method for detecting and/or avoiding computing attacks including overload type attacks.

FIG. 7 discloses aspects of performing data security operations including attack detection. The method 700 may include elements that may be repeated and some elements than are performed less frequently or as part of an initialization process.

Initially, a client registers 702 with a security service. Registering the client may include setting thresholds for each of the counters the client desires to use, setting weights for operations, or the like.

Once the client is registered, the method 700 may begin operation. Initially, information is received 704 from the client at the security service. As previously indicated, the information provided to the security service reflects an action that occurred at the client. Thus, if the client receives an authentication request from User A, the information provided by the client to the security service may include data conveying that an authentication request was received from User A.

The information received from the client is then processed 706 by the security service. This may include adjusting 708 relevant counters (incrementing/decrementing the counters and considering 710 weights where appropriate.

After processing the information, the security service can compare counters to the associated thresholds and send 712 a response to the client. The response may be success, which indicates that the request can proceed. The response may be fail or other negative response such as insufficient resources. The client may then fail the request and send an appropriate response to the requesting client.

As previously stated, the information received from the client may come from one of many replicas or servers associated with the client. The security service can provide a holistic security service that does not require the servers or clients to communicate with each other. When a negative response is generated, the negative response may be sent to all replicas or servers when necessary. Alternatively, the client may have an interface that allows messages to be distributed to the servers or replicas as necessary.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM) or containers.

Particularly, devices in the operating environment may take the form of software, physical machines, VMs, or containers, or any combination of these, though no particular device implementation or configuration is required for any embodiment.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted with respect to the example method of Figure(s) XX that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving information from a client at a security service, processing the information to determine whether the information is indicative of an attack on the client, wherein processing the information includes adjusting counters relevant to the information and comparing the counters to associated thresholds, and sending a response to the client based on the comparison, wherein a success is sent as the response when none of the relevant counters exceed the associated thresholds and wherein a fail is sent as the response when at least one of the relevant counters exceeds the associated threshold.

Embodiment 2. The method of claim 1, wherein processing the information includes considering weights when the information relates to operations.

Embodiment 3. The method of claim 1 and/or 2, wherein the information relates to authentication attempts, further comprising incrementing at least one of an authentication attempts counter and an authentication attempts per user counter.

Embodiment 4. The method of claim 1, 2, and/or 3, wherein the information relates to connection requests, further comprising incrementing at least one of a connection attempts counter and a client filter counter.

Embodiment 5. The method of claim 1, 2, 3, and/or 4, wherein the information relates to operation requests, further comprising incrementing at least one of a per operation counter and a client based operation counter.

Embodiment 6. The method of claim 1, 2, 3, 4, and/or 5, wherein the information relates to a network, further comprising incrementing at least one of a per subnet counter and a client subnet counter.

Embodiment 7. The method of claim 1, 2, 3, 4, 5, and/or 6, wherein adjusting the counters includes incrementing or decrementing at least one counter.

Embodiment 8. The method of claim 1, 2, 3, 4, 5, 6, and/or 7, wherein the fail is an includes at least one of an insufficient resources message, a retry after delay message, or a denied message.

Embodiment 9. The method of claim 1, 2, 3, 4, 5, 6, 7, and/or 8, wherein the client includes a distributed application having multiple replicas, wherein the counters account for requests received by all of the replicas and wherein the response is a centralized response that applies to all replicas without requiring the replicase to communicate with each other regarding the requests sent to the security service.

Embodiment 10. The method of claim 1, 2, 3, 4, 5, 6, 7, 8, and/or 9, wherein at least some of the counters are tuples.

Embodiment 11. A method for performing any of the operations, methods, or processes, or any portion of any of these or any combination thereof, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
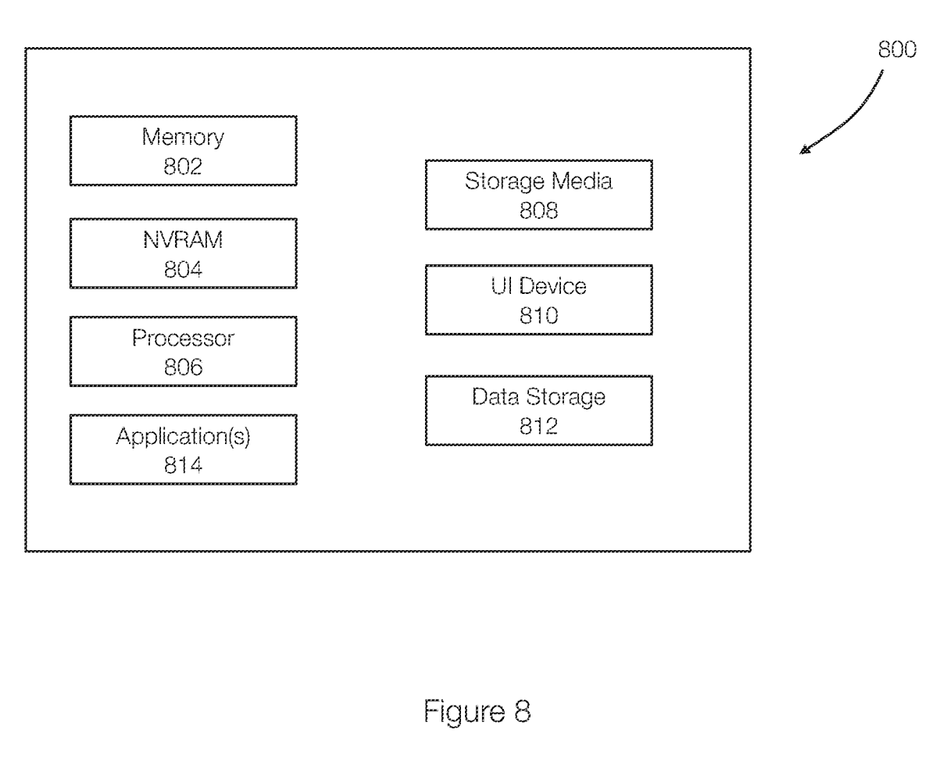
FIG. 8 discloses aspects of a computing system or device.

With reference briefly now to FIG. 8 any one or more of the entities disclosed, or implied, by the Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware 812 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting an attack on a distributed application running on multiple servers, the method comprising:
   receiving, at a centralized security service executing on separate hardware from the servers, information from each of the servers, wherein the information is generated in response to requests received at the servers and wherein the centralized security service is configured to communicate individually and unidirectionally with each of the servers via a network interface, and wherein the servers are not configured to communicate with each other in any form;
   processing, at the centralized security service, the information to determine whether the information is indicative of an attack on the distributed application, wherein processing the information includes adjusting counters, maintained by the centralized security service, relevant to the information and comparing the counters to associated thresholds, wherein the centralized security service is configured to detect an attack on the distributed application based on a combination of request data received from all of the servers, without sharing or forwarding any such information between the servers themselves; and
   sending a single response from the centralized security service to each of the servers based on the comparison, wherein a success is sent as the response when none of the relevant counters exceed the associated thresholds and wherein a fail is sent as the response when at least one of the relevant counters exceeds the associated threshold and wherein each of the servers is configured to apply the received response without reference to any locally observed activity or communication from any other server.

2. The method of claim 1, wherein the information relates to authentication attempts, further comprising incrementing at least one of an authentication attempts counter and an authentication attempts per user counter.

3. The method of claim 1, wherein the information relates to connection requests, further comprising incrementing at least one of a connection attempts counter and a client filter counter.

4. The method of claim 1, wherein the information relates to operation requests, further comprising incrementing at least one of a per operation counter and a client based operation counter.

5. The method of claim 4, further comprising considering weights associated with the operation requests.

6. The method of claim 1, wherein the information relates to a network, further comprising incrementing at least one of a per subnet counter and a client subnet counter.

7. The method of claim 1, wherein adjusting the counters includes incrementing or decrementing at least one counter.

8. The method of claim 1, wherein the fail includes at least one of an insufficient resources message, a retry after delay message, a threshold exceeded message, or a denied message.

9. The method of claim 1, wherein the counters account for requests received by all of the servers and wherein the response is a centralized response that applies to all servers without requiring the servers to communicate with each other regarding the requests received by the servers.

10. The method of claim 1, wherein at least some of the counters are tuples.

11. A non-transitory storage medium having stored therein instructions that are executable by one or more hardware processors to perform operations for detecting an attack on a distributed application running on multiple servers, the operations comprising:
    receiving, at a centralized security service executing on separate hardware from the servers, information from each of the servers, wherein the information is generated in response to requests received at the servers and wherein the centralized security service is configured to communicate individually and unidirectionally with each of the servers via a network interface, and wherein the servers are not configured to communicate with each other in any form;
    processing, at the centralized security service, the information to determine whether the information is indicative of an attack on the distributed application, wherein processing the information includes adjusting counters, maintained by the centralized security service, relevant to the information and comparing the counters to associated thresholds, wherein the centralized security service is configured to detect an attack on the distributed application based on a combination of request data received from all of the servers, without sharing or forwarding any such information between the servers themselves; and sending a single response from the centralized security service to each of the servers based on the comparison, wherein a success is sent as the response when none of the relevant counters exceed the associated thresholds and wherein a fail is sent as the response when at least one of the relevant counters exceeds the associated threshold and wherein each of the servers is configured to apply the received response without reference to any locally observed activity or communication from any other server.

12. The non-transitory storage medium of claim 11, wherein the information relates to authentication attempts, further comprising incrementing at least one of an authentication attempts counter and an authentication attempts per user counter.

13. The non-transitory storage medium of claim 11, wherein the information relates to connection requests, further comprising incrementing at least one of a connection attempts counter and a client filter counter.

14. The non-transitory storage medium of claim 11, wherein the information relates to operation requests, further comprising incrementing at least one of a per operation counter and a client based operation counter.

15. The non-transitory storage medium of claim 11, further comprising considering weights associated with the operation requests.

16. The non-transitory storage medium of claim 11, wherein the information relates to a network, further comprising incrementing at least one of a per subnet counter and a client subnet counter.

17. The non-transitory storage medium of claim 11, wherein adjusting the counters includes incrementing or decrementing at least one counter.

18. The non-transitory storage medium of claim 11, wherein the fail is an includes at least one of an insufficient resources message, a retry after delay message, or a denied message.

19. The non-transitory storage medium of claim 11, wherein the counters account for requests received by all of the servers and wherein the response is a centralized response that applies to all servers without requiring the servers to communicate with each other regarding the requests received by the servers.

20. The non-transitory storage medium of claim 11, wherein at least some of the counters are tuples.

* * * * *